US008708227B1

(12) United States Patent
Oakes, III et al.

(10) Patent No.: US 8,708,227 B1
(45) Date of Patent: *Apr. 29, 2014

(54) SYSTEMS AND METHODS FOR REMOTE DEPOSIT OF CHECKS

(75) Inventors: Charles Lee Oakes, III, San Antonio, TX (US); Randy Ray Morlen, San Antonio, TX (US); Michael Frank Morris, San Antonio, TX (US); Reynaldo Medina, III, San Antonio, TX (US); Greg Alan Harpel, San Antonio, TX (US); Gabriel Glenn Gavia, San Antonio, TX (US); R. Bharat Prasad Nuggehalli, San Antonio, TX (US); Frank Kyle Major, San Antonio, TX (US); Jeffrey Neal Pollack, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 970 days.

This patent is subject to a terminal disclaimer.

(21) Appl. No.: 11/590,974

(22) Filed: Oct. 31, 2006

(51) Int. Cl.
*G06Q 20/04* (2012.01)
*G06K 7/10* (2006.01)

(52) U.S. Cl.
CPC ............ *G06Q 20/04* (2013.01); *G06K 7/10861* (2013.01); *G06Q 20/042* (2013.01)
USPC .............................. 235/379; 235/380; 705/45

(58) Field of Classification Search
CPC .. G06Q 20/04; G06Q 20/042; G06K 7/10861
USPC ..................................... 235/379, 380; 705/45
See application file for complete search history.

(56) References Cited

U.S. PATENT DOCUMENTS

| 3,005,282 | A | 10/1961 | Christiansen |
| 3,341,820 | A | 9/1967 | Grillmeier, Jr. et al. |
| 3,576,972 | A | 5/1971 | Wood |
| 3,593,913 | A | 7/1971 | Bremer |
| 3,620,553 | A | 11/1971 | Donovan |
| 3,648,242 | A | 3/1972 | Grosbard |
| 3,800,124 | A | 3/1974 | Walsh |
| 3,816,943 | A | 6/1974 | Henry |
| 4,002,356 | A | 1/1977 | Weidmann |
| 4,060,711 | A | 11/1977 | Buros |
| 4,070,649 | A | 1/1978 | Wright, Jr. et al. |
| 4,128,202 | A | 12/1978 | Buros |
| 4,136,471 | A | 1/1979 | Austin |
| 4,205,780 | A | 6/1980 | Burns |

(Continued)

OTHER PUBLICATIONS

Federal Check 21 Act, "New Check 21 Act Effective Oct. 28, 2004: Banks No Longer Will Return Original Cancelled Checks," Consumer Union's FAQ's and Congressional Testimony on Check 21, www.consumerlaw.org/initiatives/content/check21_content.html, downloaded Dec. 2005, 20 pages.

(Continued)

*Primary Examiner* — Daniel Felten
(74) *Attorney, Agent, or Firm* — Brinks Gilson & Lione

(57) ABSTRACT

Remote deposit of checks can be facilitated by a financial institution. A customer's general purpose computer and image capture device may be leveraged to capture an image of a check and deliver the image to financial institution electronics. Additional data for the transaction may be collected as necessary. The transaction can be automatically accomplished utilizing the images and data thus acquired.

12 Claims, 6 Drawing Sheets

(56) References Cited

U.S. PATENT DOCUMENTS

| | | |
|---|---|---|
| 4,305,216 A | 12/1981 | Skelton |
| 4,321,672 A | 3/1982 | Braun |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldston |
| 4,640,413 A | 2/1987 | Kaplan |
| 4,644,144 A | 2/1987 | Chandek |
| 4,722,444 A | 2/1988 | Murphy |
| 4,722,544 A | 2/1988 | Weber |
| 4,727,435 A | 2/1988 | Otani et al. |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,927,071 A | 5/1990 | Wood |
| 4,934,587 A | 6/1990 | McNabb |
| 4,975,735 A | 12/1990 | Bright |
| 5,022,683 A | 6/1991 | Barbour |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,193,121 A | 3/1993 | Elischer et al. |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,321,816 A | 6/1994 | Rogan |
| 5,347,302 A | 9/1994 | Simonoff |
| 5,350,906 A | 9/1994 | Brody |
| 5,373,550 A * | 12/1994 | Campbell et al. ........ 379/100.11 |
| 5,419,588 A | 5/1995 | Wood |
| 5,422,467 A | 6/1995 | Graef |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,577,179 A | 11/1996 | Blank |
| 5,583,759 A | 12/1996 | Geer |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray |
| 5,678,046 A | 10/1997 | Cahill et al. |
| 5,680,611 A | 10/1997 | Rail |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,784,503 A | 7/1998 | Bleecker, III et al. |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,725 A | 2/1999 | Bellinger et al. |
| 5,878,337 A | 3/1999 | Joao |
| 5,893,101 A | 4/1999 | Balogh et al. |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard ........................ 705/75 |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin et al. |
| 6,012,048 A | 1/2000 | Gustin et al. |
| 6,014,454 A | 1/2000 | Kunkler |
| 6,021,202 A | 2/2000 | Anderson |
| 6,021,397 A | 2/2000 | Jones |
| 6,029,887 A | 2/2000 | Furuhashi |
| 6,030,000 A | 2/2000 | Diamond |
| 6,032,137 A * | 2/2000 | Ballard ........................ 705/75 |
| 6,038,553 A | 3/2000 | Hyde |
| 6,053,405 A | 4/2000 | Irwin, Jr. et al. |
| 6,073,119 A | 6/2000 | Bornemisza-wahr |
| 6,085,168 A | 7/2000 | Mori |
| 6,097,834 A | 8/2000 | Krouse |
| 6,097,845 A | 8/2000 | Ng et al. |
| 6,097,885 A | 8/2000 | Rayner |
| 6,105,865 A | 8/2000 | Hardesty |
| 6,141,339 A | 10/2000 | Kaplan et al. |
| 6,145,738 A | 11/2000 | Stinson et al. |
| 6,159,585 A | 12/2000 | Rittenhouse |
| 6,170,744 B1 | 1/2001 | Lee |
| 6,188,506 B1 | 2/2001 | Kaiserman |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,826 B1 | 9/2001 | Richards |
| 6,293,469 B1 | 9/2001 | Masson et al. |
| 6,304,860 B1 | 10/2001 | Martin |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,450,403 B1 * | 9/2002 | Martens et al. ............... 235/379 |
| 6,470,325 B1 | 10/2002 | Leemhuis |
| 6,505,178 B1 | 1/2003 | Flenley |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,654,487 B1 | 11/2003 | Downs, Jr. |
| 6,661,910 B2 | 12/2003 | Jones et al. |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | Mcneal |
| 6,738,496 B1 | 5/2004 | Van Hall |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss |
| 6,763,226 B1 | 7/2004 | McZeal |
| 6,781,962 B1 | 8/2004 | Williams |
| 6,786,398 B1 | 9/2004 | Stinson |
| 6,789,054 B1 | 9/2004 | Makhlouf |
| 6,796,491 B2 | 9/2004 | Nakajima |
| 6,806,903 B1 | 10/2004 | Okisu et al. |
| 6,813,733 B1 | 11/2004 | Li |
| 6,829,704 B2 | 12/2004 | Zhang |

(56) References Cited

U.S. PATENT DOCUMENTS

| | | |
|---|---|---|
| 6,856,965 B1 | 2/2005 | Stinson |
| 6,863,214 B2 | 3/2005 | Garner et al. |
| 6,870,947 B2 | 3/2005 | Kelland |
| 6,898,314 B2 | 5/2005 | Kung et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 7,003,040 B2 | 2/2006 | Yi |
| 7,004,382 B2 | 2/2006 | Sandru |
| 7,010,155 B2 | 3/2006 | Koakutsu et al. |
| 7,016,704 B2 | 3/2006 | Pallakoff |
| 7,039,048 B1 | 5/2006 | Monta |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,184,980 B2 | 2/2007 | Allen-Rouman et al. |
| 7,197,173 B2 | 3/2007 | Jones et al. |
| 7,200,255 B2 | 4/2007 | Jones |
| 7,204,412 B2 | 4/2007 | Foss, Jr. |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones et al. |
| 7,356,505 B2 | 4/2008 | March |
| 7,377,425 B1 | 5/2008 | Ma |
| 7,379,978 B2 | 5/2008 | Anderson |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall |
| 7,401,048 B2 | 7/2008 | Rosedale et al. |
| 7,403,917 B1 | 7/2008 | Larsen |
| 7,406,198 B2 | 7/2008 | Aoki et al. |
| 7,421,410 B1 | 9/2008 | Schechtman et al. |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Satou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,587,066 B2 | 9/2009 | Cordery et al. |
| 7,587,363 B2 | 9/2009 | Cataline et al. |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,668,363 B2 | 2/2010 | Price |
| 7,672,940 B2 | 3/2010 | Viola |
| 7,676,409 B1 | 3/2010 | Ahmad |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,734,545 B1 | 6/2010 | Fogliano |
| 7,743,979 B2 | 6/2010 | Fredman |
| 7,753,268 B1 | 7/2010 | Robinson et al. |
| 7,766,244 B1 | 8/2010 | Field |
| 7,769,650 B2 | 8/2010 | Bleunven |
| 7,792,752 B1 | 9/2010 | Kay |
| 7,792,753 B1 | 9/2010 | Slater et al. |
| 7,810,714 B2 | 10/2010 | Murata |
| 7,818,245 B2 | 10/2010 | Prakash et al. |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |
| 7,912,785 B1 | 3/2011 | Kay |
| 7,949,587 B1 | 5/2011 | Morris et al. |
| 7,950,698 B2 | 5/2011 | Popadic et al. |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |

(56) References Cited

U.S. PATENT DOCUMENTS

| | | |
|---|---|---|
| 8,045,784 B2 | 10/2011 | Price et al. |
| 8,046,301 B1 | 10/2011 | Smith et al. |
| 8,204,293 B2 | 6/2012 | Csulits et al. |
| 8,235,284 B1 | 8/2012 | Prasad et al. |
| 2001/0004235 A1 | 6/2001 | Maloney |
| 2001/0014881 A1 | 8/2001 | Drummond |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. ............... 705/70 |
| 2002/0072974 A1 | 6/2002 | Pugliese |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu et al. |
| 2002/0116335 A1 | 8/2002 | Star |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1* | 10/2002 | Dutta et al. ............... 705/45 |
| 2002/0159648 A1 | 10/2002 | Alderson et al. |
| 2002/0171820 A1 | 11/2002 | Okamura |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown et al. |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura et al. |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Shimamura |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097019 A1 | 5/2005 | Jacobs |
| 2005/0097050 A1 | 5/2005 | Orcutt |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0182710 A1 | 8/2005 | Anderson |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent |
| 2005/0252955 A1 | 11/2005 | Sugai |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |

(56) References Cited

U.S. PATENT DOCUMENTS

| | | |
|---|---|---|
| 2005/0289182 A1 | 12/2005 | Pandian et al. |
| 2006/0002426 A1 | 1/2006 | Madour |
| 2006/0004660 A1 | 1/2006 | Pranger |
| 2006/0025697 A1 | 2/2006 | Kurzweil |
| 2006/0039628 A1 | 2/2006 | Li et al. |
| 2006/0039629 A1 | 2/2006 | Li |
| 2006/0041506 A1 | 2/2006 | Mason et al. |
| 2006/0045321 A1 | 3/2006 | Yu |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0064368 A1 | 3/2006 | Forte |
| 2006/0080245 A1 | 4/2006 | Bahl |
| 2006/0085516 A1 | 4/2006 | Farr et al. |
| 2006/0102704 A1 | 5/2006 | Reynders |
| 2006/0106691 A1 | 5/2006 | Sheaffer |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu et al. |
| 2006/0118613 A1 | 6/2006 | McMann |
| 2006/0124730 A1 | 6/2006 | Maloney |
| 2006/0144924 A1 | 7/2006 | Stover |
| 2006/0144950 A1 | 7/2006 | Johnson |
| 2006/0161501 A1 | 7/2006 | Waserstein |
| 2006/0164682 A1 | 7/2006 | Lev |
| 2006/0167818 A1 | 7/2006 | Wentker et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0238503 A1 | 10/2006 | Smith |
| 2006/0274164 A1 | 12/2006 | Kimura et al. |
| 2006/0279628 A1 | 12/2006 | Fleming |
| 2006/0282383 A1 | 12/2006 | Doran |
| 2006/0291744 A1 | 12/2006 | Ikeda et al. |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | VanDeburg et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt et al. |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0082700 A1 | 4/2007 | Landschaft et al. |
| 2007/0084911 A1 | 4/2007 | Crowell |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0127805 A1 | 6/2007 | Foth et al. |
| 2007/0129955 A1 | 6/2007 | Dalmia |
| 2007/0136198 A1 | 6/2007 | Foth et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0168265 A1 | 7/2007 | Rosenberger |
| 2007/0171288 A1 | 7/2007 | Inoue |
| 2007/0172107 A1 | 7/2007 | Jones et al. |
| 2007/0172148 A1 | 7/2007 | Hawley |
| 2007/0179883 A1 | 8/2007 | Questembert |
| 2007/0183000 A1 | 8/2007 | Eisen et al. |
| 2007/0183741 A1 | 8/2007 | Lerman et al. |
| 2007/0198432 A1 | 8/2007 | Pitroda et al. |
| 2007/0203708 A1 | 8/2007 | Polcyn et al. |
| 2007/0208816 A1 | 9/2007 | Baldwin et al. |
| 2007/0217669 A1 | 9/2007 | Swift et al. |
| 2007/0233585 A1 | 10/2007 | Ben Simon et al. |
| 2007/0235518 A1 | 10/2007 | Mueller et al. |
| 2007/0235520 A1 | 10/2007 | Smith et al. |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0021802 A1 | 1/2008 | Pendleton |
| 2008/0052182 A1 | 2/2008 | Marshall |
| 2008/0063253 A1 | 3/2008 | Wood |
| 2008/0068674 A1 | 3/2008 | McIntyre |
| 2008/0086420 A1 | 4/2008 | Gilder et al. |
| 2008/0086421 A1 | 4/2008 | Gilder |
| 2008/0091599 A1 | 4/2008 | Foss, Jr. |
| 2008/0097899 A1 | 4/2008 | Jackson et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0147549 A1 | 6/2008 | Rathbun |
| 2008/0162350 A1 | 7/2008 | Allen-Rouman et al. |
| 2008/0162371 A1 | 7/2008 | Rampell |
| 2008/0177659 A1 | 7/2008 | Lacey et al. |
| 2008/0180750 A1 | 7/2008 | Feldman |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder |
| 2008/0249951 A1 | 10/2008 | Gilder et al. |
| 2008/0262953 A1 | 10/2008 | Anderson |
| 2008/0275821 A1 | 11/2008 | Bishop et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0108080 A1 | 4/2009 | Meyer |
| 2009/0110281 A1 | 4/2009 | Hirabayashi |
| 2009/0141962 A1 | 6/2009 | Borgia et al. |
| 2009/0166406 A1 | 7/2009 | Pigg et al. |
| 2009/0167870 A1 | 7/2009 | Caleca et al. |
| 2009/0171819 A1 | 7/2009 | Emde et al. |
| 2009/0171825 A1 | 7/2009 | Roman |
| 2009/0173781 A1 | 7/2009 | Ramachadran |
| 2009/0185738 A1 | 7/2009 | Nepomniachtchi |
| 2009/0190823 A1 | 7/2009 | Walters |
| 2009/0192938 A1 | 7/2009 | Amos |
| 2009/0236413 A1 | 9/2009 | Mueller et al. |

(56) References Cited

U.S. PATENT DOCUMENTS

| | | |
|---|---|---|
| 2009/0252437 A1 | 10/2009 | Li |
| 2009/0254447 A1 | 10/2009 | Blades |
| 2009/0281904 A1 | 11/2009 | Pharris |
| 2009/0313167 A1 | 12/2009 | Dujari et al. |
| 2010/0007899 A1 | 1/2010 | Lay |
| 2010/0027679 A1 | 2/2010 | Sunahara et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0082470 A1 | 4/2010 | Walach |
| 2010/0165015 A1 | 7/2010 | Barkley et al. |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0312705 A1 | 12/2010 | Caruso et al. |
| 2011/0112967 A1 | 5/2011 | Anderson et al. |
| 2011/0310442 A1 | 12/2011 | Popadic et al. |

OTHER PUBLICATIONS

The Automated Clearinghouse, "Retail Payment Systems; Payment Instruments, Clearing and Settlement; The Automated Clearinghouse (ACH)," www.ffiec.gov/ffiecinfobase/booklets/Retail/retail_02d.html, downloaded Dec. 2005, 3 pages.

Fest, G., "Patently Unaware," *Bank Technology News*, Apr. 2006, Retrieved from the Internet at URL: http://banktechnews.com/article.html?id=20060403T7612618, 5 pages.

Website: Blue Mountain Consulting, URL: www.bluemountainconsulting.com/, Downloaded Apr. 26, 2006, 3 pages.

Website: RemoteDepositCapture.com, URL: www.RemoteDepositCapture.com/, 2006, 5 pages.

"Accept "Customer Not Present" Checks," Accept Check Online, http://checksoftware.com, Cited in patent No. 7,900,822, as dated 2007 (1 pg).

"Adjusting Brightness and Contrast", www.eaglesoftware.com/adjustin.htm, retrieved on May 4, 2009 (4 pgs).

"Best practices for producing quality digital image files," Digital Images Guidelines, http://deepblue.lib.umich.edu/bitstream/2027.42/40247/1/Images-Best_Practice.pdf, downloaded 2007 (2 pgs).

"Chapter 7 Payroll Programs," Uniform Staff Payroll System, http://www2.oecn.k12.oh.us/www/ssdt/usps/usps_user_guide_005.html, Cited in patent No. 7,900,822, as dated 2007 (9 pgs).

"Check 21—The check is not in the post", RedTitan Technology 2004 http://www.redtitan.com/check21/htm (3 pgs).

"Check 21 Solutions," Columbia Financial International, Inc. http://www.columbiafinancial.us/check21/solutions.htm, Cited in patent No. 7,900,822, as dated 2007 (8 pgs).

"Check Fraud: A Guide to Avoiding Losses", All Net, http://all.net/books/audit/checkfraud/security.htm, Cited in patent No. 7,900,822, as dated 2007 (1 pg).

"Compliance with Regulation CC", http./www/federalreserve.gov/Pubs/regcc/regcc.htm, Jan. 24, 2006 (6 pgs).

"Customer Personalized Bank Checks and Address Labels" Checks Your Way Inc., http://www.checksyourway.com/htm/web_pages/faq.htm, Cited in patent No. 7,900,822, as dated 2007 (6 pgs).

"Direct Deposit Application for Payroll", Purdue University, Business Office Form 0003, http://purdue.edu/payroll/pdf/directdepositapplication.pdf, Jul. 2007 (2 pgs).

"Direct Deposit Authorization Form", www.umass.edu/humres/library/DDForm.pdf, May 2003 (3 pgs).

"Direct Deposit," University of Washington, http://www.washington.edu/admin/payroll/directdeposit.html, Cited in patent No. 7,900,822, as dated 2007 (3 pgs).

"Electronic Billing Problem: The E-check is in the mail" American Banker-vol. 168, No. 95, May 19, 2003 (4 pgs).

"Frequently Asked Questions" Bank of America, http://www/bankofamerica.com/deposits/checksave/index.cfm?template-lc_faq_bymail, Cited in patent No. 7,900,822, as dated 2007 (2 pgs).

"Full Service Direct Deposit", www.nonprofitstaffing.com/images/upload/dirdepform.pdf. Cited in patent No. 7,900,822, as dated 2001, (2 pgs).

"How to Digitally Deposit a Check Image", Smart Money Daily, Copyright 2008 (5 pgs).

"ImageNet Mobile Deposit Provides Convenient Check Deposit and Bill Pay to Mobile Consumers," Miteksystems, 2008 (2 pgs).

"It's the easiest way to Switch banks", LNB, http://www.inbky.com/pdf/LNBswitch-kit10-07.pdf Cited in patent No. 7,996,316, as dated 2007 (7 pgs).

"Lesson 38—More Bank Transactions", Turtle Soft, http://www.turtlesoft.com/goldenseal-software-manual.lesson38.htm, Cited in patent No. 7,900,822, as dated 2007 (8 pgs).

"Middleware", David E. Bakken, Encyclopedia of Distributed Computing, Kluwer Academic Press, 2001 (6 pgs).

"Mitek Systems Announces Mobile Deposit Application for Apple iPhone," http://prnewswire.com/cgi-bin/stories/pl?ACCT=104&STORY=/www/story/10-01- . . . , Nov. 25, 2008 (2 pgs).

"Personal Finance", PNC, http://www.pnc.com/webapp/unsec/productsandservice.do?sitearea=/PNC/home/personal/account+services/quick+switch/quick+switch+faqs, Cited in patent No. 7,900,822, as dated 2007 (12 pgs).

"Refractive index" Wikipedia, the free encyclopedia; http://en.wikipedia.org./wiki/refractiveindex.com Oct. 16, 2007 (4 pgs).

"Remote Deposit Capture", Plante & Moran, http://plantemoran.com/industries/fincial/institutions/bank/resources/community+bank+advisor/ 2007+summer+issue/remote+deposit+capture.htm, Cited in patent No. 7,900,822, as dated 2007 (3 pgs).

"Remote Deposit" National City, http://www.nationalcity.com/smallbusiness/cashmanagement/remotedeposit/default.asp; Cited in patent No. 7,900,822, as dated 2007 (1 pg).

"Save on ATM Fees", RedEye Edition, Chicago Tribune, Chicago, IL Jun. 30, 2007 (2 pgs).

"Switching Made Easy," Bank of North Georgia, http://www.banknorthgeorgia.com/cmsmaster/documents/286/documents616.pdf, 2007 (7 pgs).

"Two Words Every Business Should Know: Remote Deposit," Canon, http://www.rpsolutions.com/rpweb/pdfs/canon_rdc.pdf, 2005 (7 pgs).

"Virtual Bank Checks", Morebusiness.com, http://www.morebusiness.com/running_your business/businessbits/d908484987.brc, Cited in patent No. 7,900,822, as dated 2007 (3 pgs).

"WallStreetGrapevine.com" Stocks on the Rise: JADG, BKYI, MITK; Mar. 3, 2008 (4 pgs).

"What is check Fraud", National Check Fraud Center, http://www.ckfraud.org/ckfraud.html , Cited in patent No. 7,900,822, as dated 2007 (12 pgs).

Affinity Federal Credit Union, "Affinity Announces Online Deposit," Aug. 4, 2005 (1 pg).

Albrecht, W. Steve, "Check Kiting: Detection, Prosecution and Prevention," The FBI Law Enforcement Bulletin, Nov. 1, 1993 (6 pgs).

Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).

Amber Avalona-Butler / Paraglide, "At Your Service: Best iPhone Apps for Military Lifestyle," Jul. 9, 2010 (2 pgs).

Anderson, Milton M. "FSML and Echeck", Financial Services Technology Consortium, 1999 (17 pgs).

Archive Index Systems; Panini My Vision X-30 or VX30 or X30 © 1994-2008 Archive Systems, Inc. P./O. Box 40135 Bellevue, WA USA 98015 (2 pgs).

Automated Merchant Systems, Inc., "Electronic Check Conversion," http://www.automatedmerchant.com/electronic_check_conversion.cfm, 2006, downloaded Oct. 18, 2006 (3 pgs).

Blafore, Bonnie "Lower Commissions, Fewer Amenities", Better Investing, Madison Heights: Feb. 2003, vol. 52, Iss 6, (4 pgs).

BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).

(56) References Cited

OTHER PUBLICATIONS

Bruno, M., "Instant Messaging," Bank Technology News, Dec. 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).
Carrubba, P. et al., "Remote Deposit Capture: A White Paper Addressing Regulatory, Operational and Risk Issues," NetDeposit Inc., 2006 (11 pgs).
Century Remote Deposit High-Speed Scanner User's Manual Release 2006, (Century Manual), Century Bank, 2006, (32 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit," Mitek Systems, Inc., San Diego, California and Waterloo, Ontario, (Feb. 24, 2009), 2 pgs.
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Dinan, R.F. et al., "Image Plus High Performance Transaction System", IBM Systems Journal, 1990 vol. 29, No. 3 (14 pgs).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Reserve Board, "Check Clearing for the 21st Century Act", FRB, http://www.federalreserve.gov/paymentsystems/truncation/, Mar. 1, 2006 (1 pg).
Federal Reserve System, "12 CFR, Part 229 [Regulation CC; ]: Availability of Funds and Collection of Checks," Federal Registrar, Apr. 28, 1997, pp. 1-50.
Federal Reserve System, "Part IV, 12 CFR Part 229 [Regulation CC;]: Availability of Funds and Collection of Checks; Final Rule," Federal Registrar, vol. 69, No. 149, Aug. 4, 2004, pp. 47290-47328.
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Garry, M., "Checking Options: Retailers face an evolving landscape for electronic check processing that will require them to choose among several scenarios," Supermarket News, vol. 53, No. 49, 2005 (3 pgs).
German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).

Hartly, Thomas, "Banks Check Out New Image", Business First, Buffalo: Jul. 19, 2004, vol. 20, Issue 43, (3 pgs).
Heckenberg, D. "Using Mac OS X for Real-Time Image Processing" Oct. 8, 2003 (15 pgs).
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).
Image Master, "Photo Restoration: We specialize in digital photo restoration and photograph repair of family pictures", http://www.imphotorepair.com, Cited in patent No. 7,900,822, as downloaded Apr. 2007 (1 pg).
Investment Systems Company, "Portfolio Accounting System," 2000, pp. 1-32.
JBC, "What is a MICR Line?," eHow.com, retrieved from http://www.ehow.com/about_4684793_what-micr-line.html on May 4, 2009 (2 pgs).
Kendrick, Kevin B., "Check Kiting, Float for Purposes of Profit," Bank Security & Fraud Prevention, vol. 1, No. 2, 1994 (3 pgs).
Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).
Knestout, Brian P. et al., "Banking Made Easy" Kiplinger's Personal Finance Washington, Jul. 2003, vol. 57, Iss 7 (5 pgs).
Kornai Andras et al., "Recognition of Cursive Writing on Personal Checks", Proceedings of International Workshop on the Frontiers in Handwriting Recognition, Cited in patent No. 7,900,822, as dated Sep. 1996, (6 pgs).
Levitin, Adam J., Remote Deposit Capture: A Legal and Transactional Overview, Banking Law Journal, p. 115, 2009 (RDC).
Masonson, L., "Check Truncation and Ach Trends—Automated Clearing Houses", healthcare financial management associate, http://www.findarticles.com/p/articles/mLm3276/is_n7_v47/ai_14466034/print, 1993 (2 pgs).
Matthews, Deborah, "Advanced Technology Makes Remote Deposit Capture Less Risky," Indiana Bankers Association, Apr. 2008 (2 pgs).
Metro 1 Credit Union, "Remote Banking Services," hltp://ww\\i.metro1cu.org/metro1cu/remote.html, downloaded Apr. 17, 2007 (4 pgs).
Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/mi qa3799/is200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fisery Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm, Cited in patent No. 7,900,822, as dated 2006 (3 pgs).
Palacios, Rafael et al., "Automatic Processing of Brazilian Bank Checks". Cited in patent No. 7,900,822, as dated 2002 (28 pgs).
Patterson, Scott "USAA Deposit@Home—Another WOW moment for Net Banking", NextCU.com, Jan. 26, 2007 (5 pgs).

(56) References Cited

OTHER PUBLICATIONS

Rao, Bharat; "The Internet and the Revolution in Distribution: A Cross-Industry Examination"; Technology in Society; 1999; pp. 287-306; vol. 21, No. 3 (20 pgs).
Remotedepsitcapture.com, LLC, "Remote Deposit Capture Overview," ROC Overview, http://remotedepositcapture.com/overview/RDC_overview.htm, Cited in patent No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rose, Sarah et al., "Best of the We: The Top 50 Financial Websites", Money, New York, Dec. 1999, vol. 28, Iss. 12 (8 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html (2 pgs).
Tygar, J.D., Atomicity in Electronic Commerce, In ACM Networker, 2:2, Apr./May 1998 (12 pgs).
Valentine, Lisa, "Remote Deposit Capture Hot Just Got Hotter," ABA Banking Journal, Mar. 2006, pp. 1-9.
Wade, Will, "Early Notes: Updating Consumers on Check 21" American Banker Aug. 10, 2004 (3 pgs).
Wallison, Peter J., "Wal-Mart Case Exposes Flaws in Banking-Commerce Split", American Banker, vol. 167. No. 8, Jan. 11, 2002 (3 pgs).
White, J.M. et al., "Image Thresholding for Optical Character Recognition and Other Applications Requiring Character Image Extraction", IBM J. Res. Development, Jul. 1983, vol. 27, No. 4 (12 pgs).
Whitney et al., "Reserve Banks to Adopt DSTU X9.37/2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia ®, "Remote Deposit," http://en.wikipedia.org/wiki/Remote_deposit, 2007 (3 pgs).
Wolfe, Daniel, "Check Image Group Outlines Agenda," American Banker, New York, N.Y.: Feb. 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A. 1.
Zhang, C.Y., "Robust Estimation and Image Combining" Astronomical Data Analysis Software and Systems IV, ASP Conference Series, 1995 (5 pgs).
Zions Bancorporation, "Moneytech, the technology of money in our world: Remote Deposit," http://www.bankjunior.com/pground/moneytech/remote_deposit.jsp, 2007 (2 pgs).
Application as filed Apr. 3, 2008 for U.S. Appl. No. 12/062,143 (27 pgs).
Application as filed Aug. 19, 2010 for U.S. Appl. No. 12/859,741 (235 pgs).
Application as filed Aug. 21, 2008 for U.S. Appl. No. 12/195,723 (38 pgs).
Application as filed on Aug. 21, 2009 for U.S. Appl. No. 12/545,127 (45 pgs).
Application as filed Aug. 28, 2009 for U.S. Appl. No. 12/549,443 (41 pgs).
Application as filed Dec. 20, 2006 for U.S. Appl. No. 11/613,656 (21 pgs).
Application as filed Dec. 30, 2010 for U.S. Appl. No. 12/982,494 (280 pgs).
Application as filed Dec. 30, 2010 for U.S. Appl. No. 12/982,561 (275 pgs).
Application as filed Feb. 15, 2012 for U.S. Appl. No. 13/397,405 (19 pgs).
Application as filed Feb. 18, 2009 for U.S. Appl. No. 12/388,005 (37 pgs).
Application as filed Jul. 13, 2006 for U.S. Appl. No. 11/487,537 (23 pgs).
Application as filed Jul. 27, 2009 for U.S. Appl. No. 12/509,613 (48 pgs).
Application as filed Jul. 27, 2009 for U.S. Appl. No. 12/509,680 (41 pgs).
Application as filed Jun. 11, 2008 for U.S. Appl. No. 12/137,051 (29 pgs).
Application as filed Jun. 8, 2011 for U.S. Appl. No. 13/155,976 (352 pgs).
Application as filed Jun. 8, 2011 for U.S. Appl. No. 13/156,007 (356 pgs).
Application as filed Jun. 8, 2011 for U.S. Appl. No. 13/156,018 (353 pgs).
Application as filed Mar. 15, 2007 for U.S. Appl. No. 11/686,924 (34 pgs).
Application as filed Mar. 15, 2007 for U.S. Appl. No. 11/686,928 (36 pgs).
Application as filed Mar. 4, 2009 for U.S. Appl. No. 12/397,671 (40 pgs).
Application as filed Mar. 4, 2009 for U.S. Appl. No. 12/397,930 (37 pgs).
Application as filed May 10, 2007 for U.S. Appl. No. 11/747,222 (35 pgs).
Application as filed Oct. 17, 2008 for U.S. Appl. No. 12/253,278 (42 pgs).
Application as filed Oct. 19, 2012 for U.S. Appl. No. 13/656,164 (32 pgs).
Application as filed Oct. 23, 2007 for U.S. Appl. No. 11/876,925 (36 pgs).
Application as filed Oct. 23, 2007 for U.S. Appl. No. 11/877,335 (29 pgs).
Application as filed Oct. 25, 2007 for U.S. Appl. No. 11/923,839 (22 pgs).
Application as filed Oct. 29, 2007 for U.S. Appl. No. 11/926,388 (23 pgs).
Application as filed Oct. 30, 2007 for U.S. Appl. No. 11/928,297 (26 pgs).
Application as filed Oct. 31, 2006 for U.S. Appl. No. 11/590,974 (31 pgs).
Application as filed Oct. 31, 2006 for U.S. Appl. No. 11/591,008 (27 pgs).
Application as filed Oct. 31, 2006 for U.S. Appl. No. 11/591,227 (58 pgs).
Application as filed Oct. 31, 2006 for U.S. Appl. No. 11/591,273 (56 pgs).
Application as filed Oct. 31, 2007 for U.S. Appl. No. 11/930,537 (27 pgs).
Application as filed Oct. 31, 2007 for U.S. Appl. No. 11/931,670 (47 pgs).
Application as filed Oct. 8, 2007 for U.S. Appl. No. 11/868,884 (30 pgs).
Application as filed Sep. 28, 2007 for U.S. Appl. No. 11/864,569 (35 pgs).
Application as filed Sep. 8, 2008 for U.S. Appl. No. 12/205,996 (30 pgs).
Application as filed Sep. 14, 2012 for U.S. Appl. No. 13/619,405 (30 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Aug. 19, 2010 for U.S. Appl. No. 12/859,752 (5 pgs).
Claims as filed on Dec. 15, 2011 for U.S. Appl. No. 13/327,478 (4 pgs).
Claims as filed on Dec. 20, 2006 for U.S. Appl. No. 11/613,671 (3 pgs).
Claims as filed on Dec. 29, 2005 for U.S. Appl. No. 11/320,998 (3 pgs).
Claims as filed on Dec. 29, 2005 for U.S. App. No. 11/321,027 (3 pgs).
Claims as filed on Dec. 8, 2010 for U.S. Appl. No. 12/963,513 (7 pgs).

(56) References Cited

OTHER PUBLICATIONS

Claims as filed on Feb. 15, 2012 for U.S. Appl. No. 13/397,437 (6 pgs).
Claims as filed on Feb. 16, 2011 for U.S. Appl. No. 13/028,477 (3 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Claims as filed on Mar. 15, 2007 for U.S. Appl. No. 11/686,925 (5 pgs).
Claims as filed on May 10, 2007 for U.S. Appl. No. 11/747,223 (4 pgs).
Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Nov. 20, 2012 for U.S. Appl. No. 13/682,268 (4 pgs).
Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 14, 2012 for U.S. Appl. No. 13/619,026 (3 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Office Action from corresponding U.S. Appl. No. 11/591,003 dated Mar. 17, 2008 (11 pgs).
Final Office Action from corresponding U.S. Appl. No. 11/591,003 dated Jan. 24, 2012 (12 pgs).
Final Office Action from corresponding U.S. Appl. No. 11/591,003 dated Jun. 9, 2010 (15 pgs).
Final Office Action from corresponding U.S. Appl. No. 11/591,003 dated Oct. 17, 2008 (11 pgs).
Office Action from corresponding U.S. Appl. No. 11/591,003 dated Dec. 10, 2009 (14 pgs).
Office Action from corresponding U.S. Appl. No. 11/591,003 dated Jun. 27, 2011 (13 pgs).

\* cited by examiner

SYSTEMS AND METHODS FOR REMOTE DEPOSIT OF CHECKS

CROSS-REFERENCE TO RELATED APPLICATIONS

This application is related by subject matter to U.S. patent application Ser. No. 11/591,003, U.S. patent application Ser. No. 11/591,014, U.S. patent application Ser. No. 11/590,971, U.S. patent application Ser. No. 11/591,247, U.S. patent application Ser. No. 11/590,963, and U.S. patent application Ser. No. 11/591,025, all filed on even date herewith and also entitled "Systems and Methods for Remote Deposit of Checks."

This application is also related by subject matter to U.S. patent application Ser. No. 11/321,025, U.S. patent application Ser. No. 11/321,027, U.S. patent application Ser. No. 11/320,998 all filed on Dec. 29, 2005 and entitled "Remote Deposit of Checks," and U.S. patent application Ser. No. 11/591,131 filed Oct. 31, 2006 also entitled "Remote Deposit of Checks."

BACKGROUND

As described in U.S. patent application Ser. No. 11/321,025, checks typically provide a safe and convenient method for an individual to purchase goods and/or services. To use a check, the individual usually must open a checking account, or other similar account, at a financial institution and deposit funds, which are then available for later withdrawal. To pay for goods and/or services with a check, the payor (i.e., the buyer) usually designates a payee (i.e., the seller) and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee in return for the goods and/or services provided by the payee.

Checks have certain advantages over other forms of payment, such as cash. For example, while often considered the most liquid type of asset, cash also may be the least secure. Unlike a check, cash is usually freely transferable and does not have to be endorsed. Thus, the owner and possessor of cash is most often the same individual. Because cash is freely transferable, cash that is lost or stolen typically cannot be recovered. Therefore, the risks associated with cash transactions are often unacceptable, particularly with respect to transactions not conducted in person (e.g., by mail) and/or involving large sums of money. A check, on the other hand, provides a payor with more security because the check usually requires a payor to specify both the person and amount to be paid. Furthermore, as noted above, the check is usually not valid until it is properly signed by the payor. These safeguards help to reduce the risk that money will be lost and/or stolen and ensure that the proper payee receives the proper amount of money.

Cash may have other disadvantages as well. For example, because cash is freely transferable, there may be little or no verifiable transaction history. It is often desirable for a payor and/or payee to have physical proof that a particular transaction took place. This typically requires that the payor receive a receipt. However, receipts may contain errors and can be easily misplaced. In contrast, a bank processing a check will ordinarily create a transaction history, which may include the identity of the payee, the amount to be paid, the date of the payment, and the signature of the payor. This enables both a payor and payee to independently verify the accuracy of most transactions involving a payment by check.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. In addition to the time commitment that may be required, visiting a bank branch may be problematic for the payee if the bank's hours of operation coincide with the payee's normal hours of employment. Thus, the payee may be required to leave work early and/or change work schedules.

A check may pose other burdens for the payee. As noted above, a check may not be freely transferable, thereby limiting the payee's ability to use funds from the check. For example, it is usually difficult to for the payee to purchase goods and/or services using a check issued by the payor. While the check may be endorsed and accepted by a third party, such transactions are often disfavored because the third party may not know the payor and, thus, may not be willing to accept the risk that the payor has insufficient funds to cover the check. Therefore, the payee may not have access to the funds from the check until the payee deposits the check at the bank, the check has cleared and the funds have been credited to the payee's account. The payee may have to wait even longer if the payee chooses to deposit the check by mail. Therefore, there is a need for a convenient method of remotely depositing a check while enabling the payee to quickly access the funds from the check.

SUMMARY

The described embodiments contemplate a system, method and computer-readable medium with computer-executable instructions for remotely redeeming a negotiable instrument. In an embodiment, a novel system may include financial institution electronics, such as a server equipped with appropriate hardware and software for facilitating deposit of a check. Such electronics may be configured for receiving from a customer computer an identification of an account for deposit of a check, and an amount of said check. They may be further configured for receiving an image of a front side of said check, and for analyzing said image to determine if it meets at least one criterion. The criterion could be, for example, image size, image legibility, image orientation, image format, presence of certain image features that indicate the image in fact represents a check, and so forth. Financial institution electronics may be also configured for determining if there is an error in a deposit transaction. Numerous errors are possible candidates for detection, and several exemplary errors are provided herein. If there are no errors that warrant aborting the transaction, then such electronics may be further configured to initiate a deposit of the check.

In another embodiment, a novel system may include, for example, a computer readable medium bearing instructions that can configure a customer's general purpose computer to facilitate a check deposit. Acting under direction of such instructions, the general purpose computer may instruct a customer, for example via a display coupled such computer, in utilizing an image capture device to generate an electronic image of a front side of a check, such that said electronic image of a front side of a check meets at least one first criterion such as image size, image legibility, image orientation, image quality, and location and/or orientation of the check within the image. Instructions may further be provided for receiving the image of a front side of a check from said image capture device, and optionally instructing the customer to process the image, e.g., by approving the image and/or modifying it to meet at least one second criterion. A second criterion might also be, for example, one or more of image size, image legibility, image orientation, image quality, and location and/or orientation of the check within the image. Finally, the customer computer, acting under direction of the instructions, may deliver an approved electronic image to financial institution electronics.

Additional advantages and features of the invention are described below.

BRIEF DESCRIPTION OF THE DRAWINGS

The systems and methods for remote deposit of checks in accordance with the present disclosure are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
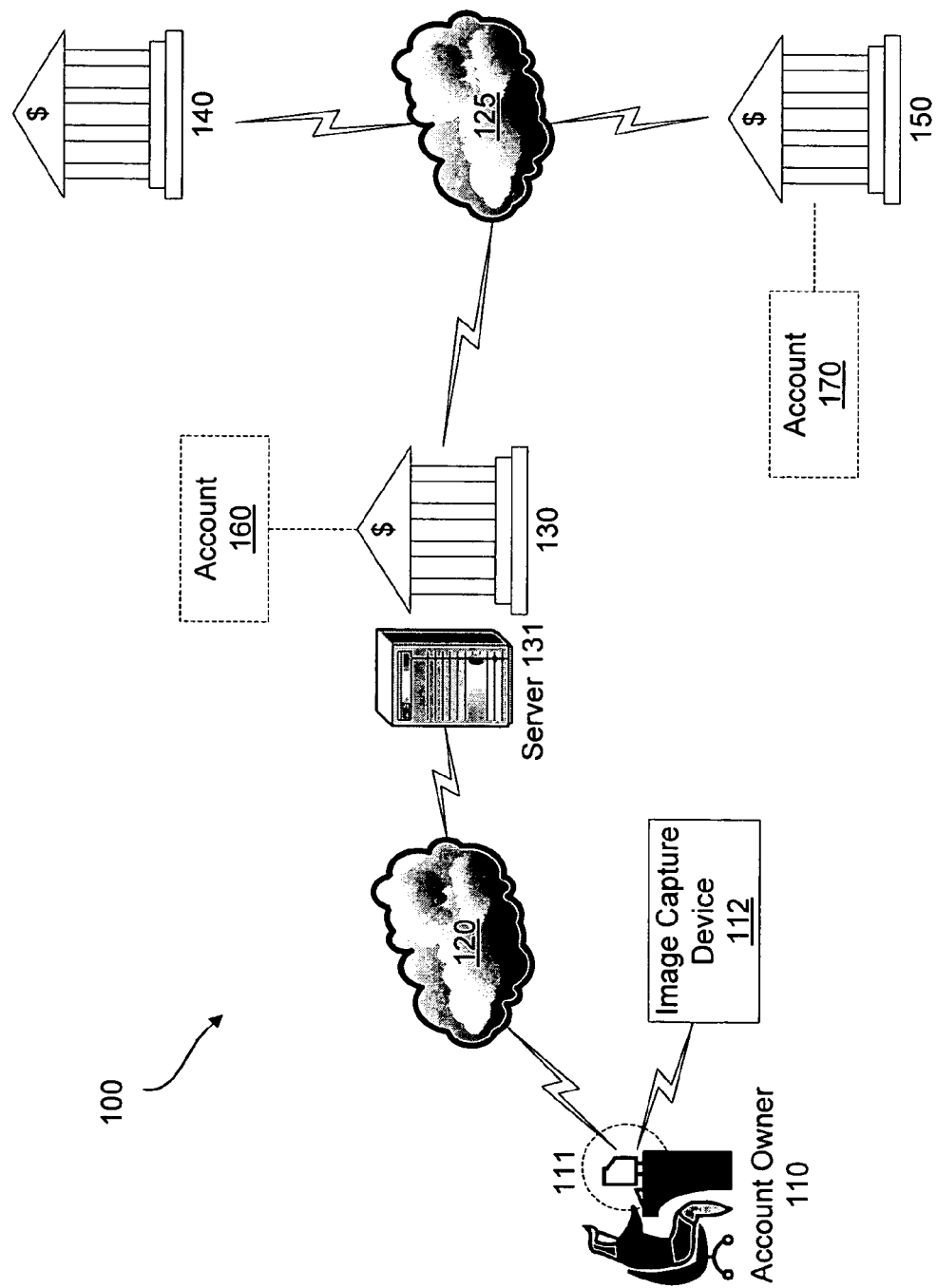
FIG. 1 illustrates a broad view of a system in which the described embodiments may be employed.

FIG. 1 illustrates an example system in which the described embodiments may be employed. System 100 may include account owner 110, e.g., a bank customer who may be located, for example, at the customer's private residence. The account owner 110 may be utilizing a customer-controlled, general purpose computer 111. General purpose computer may be coupled to an image capture device 112. Customer 110 may use the image capture device 112 to generate an image of a negotiable instrument such as a check, and may send the image, along with any other data as appropriate, via a publicly accessible network 120 to financial institution 130 electronics such as server 131.

In one embodiment, the financial institution controlling electronics 131 is also the institution at which the customer has an account 160. Financial institution 130 may perform a variety of steps to process the incoming check image and other data. For example, financial institution may ensure the check is valid, ensuring the check image is in proper form for electronic handling, ensure it is not a duplicate of a previously deposited check, and so forth. Financial institution 130 may also forward the image over a network 125 to one or more other entities 140, 150, which may be associated with an account 170 on which the check was drawn.

A general purpose computer 111 is generally a Personal Computer (PC) running one of the well-known WINDOWS® brand operating systems made by MICROSOFT® Corp., or a MACINTOSH® (Mac) brand computer, running any of the APPLE® operating systems. General purpose computers are ubiquitous today and the term should be well understood. A general purpose computer 111 may be in a desktop or laptop configuration, and generally has the ability to run any number of applications that are written for and compatible with the computer's operating system. The term "general purpose computer" specifically excludes specialized equipment as may be purchased by a business or other commercial enterprise, for example, for the specialized purpose of high-speed, high-volume check deposits. A particular advantage of embodiments of the invention is its ability to operate in conjunction with electronics that today's consumers actually own or can easily acquire, such as a general purpose computer, a scanner, and a digital camera.

Figure 2:
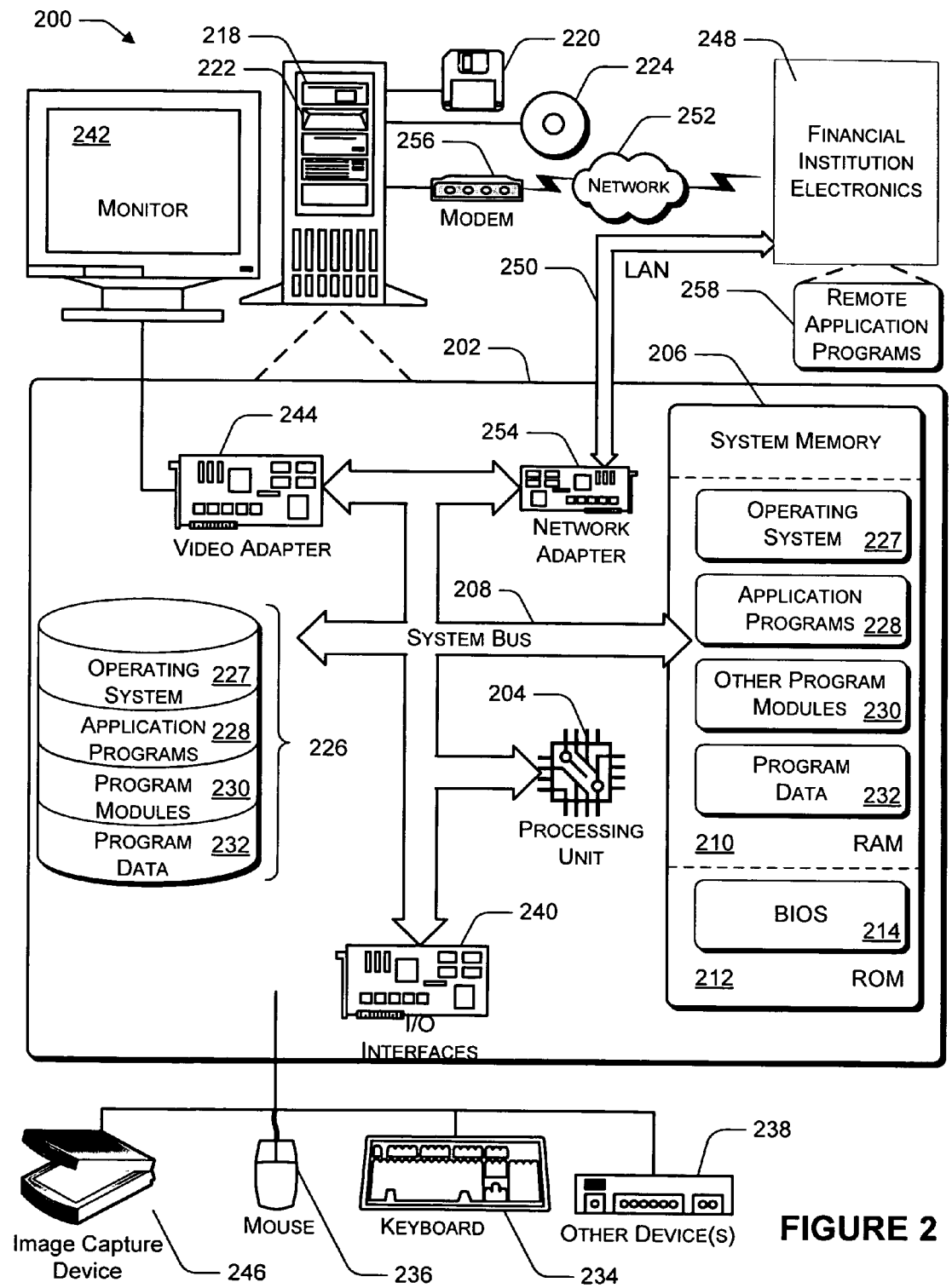
FIG. 2 an exemplary general purpose computing device that is communicatively coupled to financial institution electronics as well as an image capture device.

An exemplary general purpose computer 111 as may be utilized in conjunction with embodiments of the invention is illustrated in FIG. 2. Device electronics 200 are illustrated in FIG. 2, and a schematic blowup 202 is provided to illustrate an exemplary internal architecture of the device. Computing architecture 202 includes one or more processors or processing units 204, a system memory 206, and a bus 208 that couples various system components including the system memory 206 to processors 204. The bus 208 represents one or more of any of several types of bus structures, including a memory bus or memory controller, a peripheral bus, an accelerated graphics port, and a processor or local bus using any of a variety of bus architectures. The system memory 206 includes read only memory (ROM) 212 and random access memory (RAM) 210. A basic input/output system (BIOS) 214, containing the basic routines that help to transfer information between elements within computing device 200, such as during start-up, is stored in ROM 212.

Computing architecture 202 further includes a hard disk drive 226, and may include a magnetic disk drive 2218 for reading from and writing to a removable magnetic disk 220, and an optical disk drive 222 for reading from or writing to a removable optical disk 224 such as a CD ROM or other optical media. The hard disk drive 226, magnetic disk drive 218, and optical disk drive 224 are connected to the bus 208 by appropriate interfaces. The drives and their associated computer-readable media provide nonvolatile storage of computer-readable instructions, data structures, program modules and other data for computing device 200. Although the exemplary environment described herein employs a hard disk, a removable magnetic disk 218 and a removable optical disk 224, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 226, magnetic disk 218, optical disk 224, ROM 212, or RAM 210, including an operating system 227, one or more application programs 228, other program modules 230, and program data 232. A user may enter commands and information into computing device 200 through input devices such as a keyboard 234 and a pointing device 236. An image capture device 246 may also be coupled to the general purpose computer 200 as an input device. Other input devices 238 may include a microphone, joystick, game pad, satellite dish, or the like. These and other input devices are connected to the processing unit 204 through interfaces 240 that are coupled to the bus 208. A monitor 242 or other type of display device is also connected to the bus 208 via an interface 224, such as a video adapter 224.

Generally, the data processors of computing device 200 are programmed by means of instructions stored at different times in the various computer-readable storage media of the computer. Programs and operating systems may be distributed, for example, on floppy disks, CD-ROMs, or electronically, and are installed or loaded into the secondary memory of a computer. At execution, the programs are loaded at least partially into the computer's primary electronic memory 206.

Computing device 200 may operate in a networked environment using logical connections to one or more remote computers, such as financial institution electronics 248. The financial institution electronics 248 may be one or more server computers, routers, network PCs, and so forth, which typically include many or all of the elements described above relative to computing device 200. The financial institution electronics 248 may run remote application programs 258 which may operate in concert with application programs 228 that execute on the computer 200. For example, a "software component" as described herein may, in one embodiment, execute pursuant to commands from a remote application program 258. The software component may of course also operate in a more autonomous manner, performing certain tasks and then communicating data as necessary back to the remote application programs 258.

When used in a LAN networking environment, a computer 200 is connected to a local network 250 through a network interface or adapter 254. When used in a WAN networking environment, computing device 200 typically includes a modem 256 or other means for establishing communications over the wide area network 252, such as the Internet. The modem 256, which may be internal or external, can be connected to the bus 208 for example via a serial port interface, or by sending a signal to a wireless router which then broadcasts and receives wireless signals to and from a wireless card that is connected to the computer 200.

In a networked environment, program modules depicted relative to the computing device 200, or portions thereof, may be stored in the remote memory storage device. It will be appreciated that the network connections shown are exemplary and other means of establishing a communications link between the computers may be used.

A general purpose computer such as 200 may also be "customer-controlled." A common example of a customer-controlled computer would be a typical computer located in a private residence. The owner of such a computer typically has the power to install programs and configure the computer as they wish, subject to certain security restrictions that may be imposed by the hardware or software manufacturers. A customer-controlled computer need not be located in a private residence, however. For example, computers in college dormitories, in workplace offices, and so forth may also be considered to be "customer-controlled."

An example of a computer that would not be considered customer-controlled would be an Automatic Teller Machine (ATM) that is typically controlled by a bank or other business. Although a customer may access and utilize an ATM machine, the ATM machine is not customer-controlled because the allowed uses of the ATM machine are highly restricted. Relevant factors in determining whether a machine is customer controlled are thus the scope of operations that a customer may perform using the machine, and extent to which the customer can reconfigure the machine in some way by adding software and/or hardware components.

One of the applications 228 that may run on a general purpose computer 200 in connection with the invention is a browser. Common browsers in use today are, for example, the popular INTERNET EXPLORER® line of browsers made by MICROSOFT® Corp., the FIREFOX® browsers distributed via the MOZILLA® open source project, and the NETSCAPE NAVIGATOR® browsers also distributed via the MOZILLA® open source project. Browsers generally allow users to point to a Uniform Resource Locator (URL), and thereby retrieve information such as a web page. For example, a browser application on computer 200 could retrieve a web page that is kept at server associated with financial institution electronics 248, and display the web page on display 242 to the account owner 110 (FIG. 1), as is generally known and appreciated in the industry and by the general public.

Another application 228, or set of applications, that may run on a general purpose computer 200 in connection with the invention comprises "virtual machine" technologies such as the JAVA® virtual machine software distributed by SUN MICROSYSTEMS® Corp, and .NET® Framework distributed by MICROSOFT® Corp. In general, such applications facilitate execution of further application programs 228 in a variety of computing environments. For example, a JAVA® applet is a computer program (which may be alternatively referred to herein as a "software component") that can execute on any computer running the JAVA® virtual machine software. The applet may be provided to virtual machine software in a "source code" format, and may be compiled by a "just in time" compiler, so as to put the applet in a form that can be executed by the hardware associated with the particular computing device. These technologies are known in the art and may be utilized in connection with certain embodiments of the invention as described herein.

Referring back to FIG. 1, an image capture device 112 may be communicatively coupled to the computer 111. Image capture device 112 may be, for example, a scanner or digital camera. Computer 111 may comprise software that allows the user to control certain operations of the image capture device 112 from the computer 111. For example, modern scanner users may be familiar with the TWAIN® software is often used to control image capture from a computer 111. Similarly, digital cameras often ship along with software that allows users to move images from the camera to a computer 111, and may also provide additional functions, such as photo editing functions crop and rotate.

Figure 3:
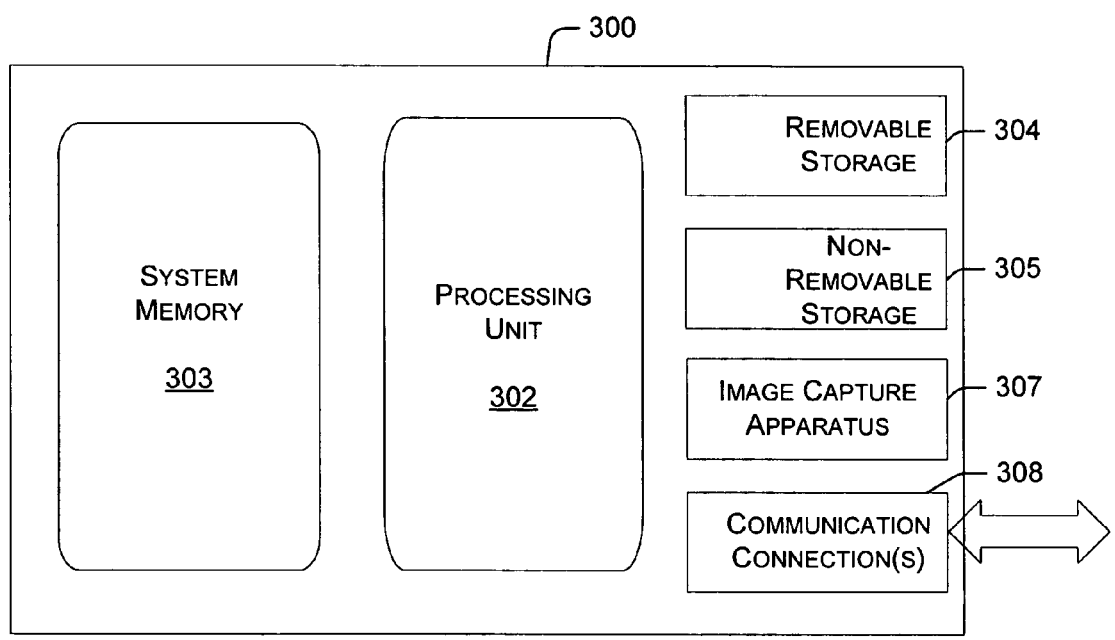
FIG. 3 illustrates an exemplary schematic architecture of an image capture device as may be used in connection with various embodiments of the invention.

Referring now to FIG. 3, a schematic illustration of an exemplary image capture device architecture 300 is illustrated. As with the general purpose computer 200 of FIG. 2, an image capture device may comprise a processing unit 302 and memory 303. Depending on the exact configuration and type of image capture device, memory 303 may be volatile (such as RAM), non-volatile (such as ROM, flash memory, etc.) or some combination of the two. Additionally, image capture device 300 may have mass storage (removable 304 and/or non-removable 305) such as magnetic or optical disks or tape. Image capture device 300 may have image capture apparatus 307 such as a scanner bed, camera lens, and so forth. Finally, image capture device 300 may include communication connections 308 to other devices, computers, networks, servers, etc. using either wired or wireless media. In particular, communication connections 308 may serve to communicatively couple device to a general purpose computer such as provided in FIG. 2.

Referring back to FIG. 1, financial institutions 130, 140 and 150 may be any type of entity capable of processing a transaction involving a negotiable instrument. For example, financial institutions 130, 140 and 150 may be a retail bank, investment bank, investment company, regional branch of the Federal Reserve, clearinghouse bank and/or correspondent bank. A negotiable instrument is usually a type of contract that obligates one party to pay a specified sum of money to another party. By way of example, and not limitation, negotiable instruments may include a check, draft, bill of exchange, promissory note, and the like.

Financial institution 130 is illustrated as associated with a server 131. Financial institution 130 may maintain and operate server 131 for the purposes of communicating with customers such as 110. Alternatively, such server may be maintained and operated by one or more third party vendors who act under the instructions of the financial institution 130, but possess skills and resources that may be more effective in competent operation of electronics. Such arrangements are well known in the industry and in this case the server 131 is nonetheless considered to be "associated" with the financial institution 130.

Account owner 110 may be an individual who owns account 160, which may be held at financial institution 130. As such, account owner 110 may be described as a customer of financial institution 130 and/or a "payee" because it is contemplated that customer 110 may deposit a check made out to him- or herself. Embodiments of the invention are also possible, however, in which the customer deposits a check made to another payee, in which case the customer and payee are not one and the same. Account 160 may be any type of account for depositing funds, such as a savings account, checking account, brokerage account, and the like. Account owner 110 may communicate with financial institution 130 by way of communication network 120, which may include an intranet, the Internet, a local area network (LAN), a wide area network (WAN), a public switched telephone network (PSTN), a cellular network, a voice over internet protocol (VoIP) network, and the like. Account owner 110 may communicate with financial institution 130 by phone, email, instant messaging, facsimile, and the like.

In one contemplated embodiment, network 120 is a publicly accessible network such as the Internet, which can presently be accessed from many private residences and many public places such as college campuses, airports, coffee shops, and restaurants throughout the United States as well as many other countries of the world. A variety of technologies are available to establish secure connections over such a public network, so that data transmitted between computer 111 and a server 131 associated with the institution 130 remains either inaccessible or indecipherable by third parties that may intercept such data. The invention may make use of any such security technologies.

Financial institutions 130, 140 and 150 may communicate with each other via a network 125. Network 125 may be a publicly accessed network such as 120. Alternatively, network 125 may have certain characteristics that differ from network 120, due to the different requirements of bank-to-bank communications. For example, one might envision certain security features and access restrictions being more important in bank-to-bank communications.

Figure 4:
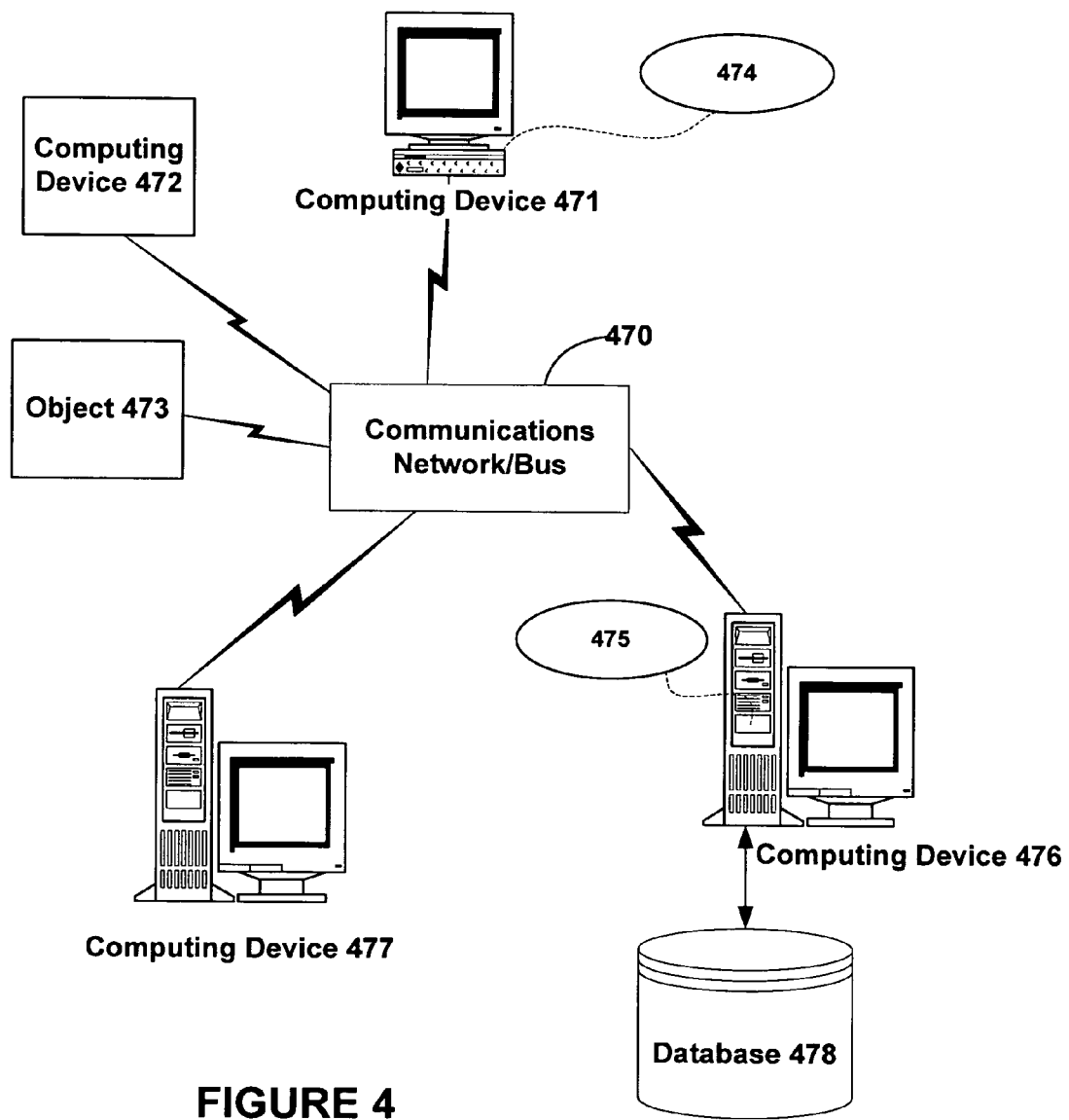
FIG. 4 illustrates an exemplary network architecture as may connect the customer's general purpose computer to financial institution electronics and may also serve to connect components of financial institution electronics as well as various financial institutions to one another.

FIG. 4 illustrates an exemplary computer network as may be implemented in connection with 120 and 125. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 4 provides a schematic diagram of an exemplary networked or distributed computing environment. The environment comprises computing devices 471, 472, 476, and 477 as well as objects 473, 474, and 475, and database 478. Each of these entities 471, 472, 473, 474, 475, 476, 477 and 478 may comprise or make use of programs, methods, data stores, programmable logic, etc. The entities 471, 472, 473, 474, 475, 476, 477 and 478 may span portions of the same or different devices such as PDAs, audio/video devices, MP3 players, personal computers, etc. Each entity 471, 472, 473, 474, 475, 476, 477 and 478 can communicate with another entity 471, 472, 473, 474, 475, 476, 477 and 478 by way of the communications network 470. In this regard, any entity may be responsible for the maintenance and updating of a database 478 or other storage element.

This network 470 may itself comprise other computing entities that provide services to the system of FIG. 4, and may itself represent multiple interconnected networks. In accordance with an aspect of the invention, each entity 471, 472, 473, 474, 475, 476, 477 and 478 may contain discrete functional program modules that might make use of an API, or other object, software, firmware and/or hardware, to request services of one or more of the other entities 471, 472, 473, 474, 475, 476, 477 and 478.

It can also be appreciated that an object, such as 475, may be hosted on another computing device 476. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 4, any entity 471, 472, 473, 474, 475, 476, 477 and 478 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Returning again to FIG. 1, in an embodiment, account owner 110 may wish to deposit a check that is drawn from account 170 at financial institution 150. Account owner 110 may deposit the check into account 160 by converting the check into electronic data and sending the data to financial institution 130. Aspects of the invention may thus comprise systems and methods carried out by the account owner 110 and his computer 111. Aspects of the invention may also comprise systems and methods carried out by the financial institution 130 and their server 131 or other electronics that facilitate and enable such deposit by the account owner 110.

For example, account owner 110 may convert the check into a digital image by scanning the front and/or back of the check using image capture device 112. Account owner 110 may then send the image to financial institution 130 using the systems and methods described herein. Please refer to FIG. 5 and corresponding description for a detailed exemplary embodiment of systems and methods for facilitating and processing a check deposit transaction. Upon receipt of the image, financial institution 130 may credit the funds to account 160. Financial institution 130 may clear the check by presenting the digital image to an intermediary bank, such as a regional branch of the Federal Reserve, a correspondent bank and/or a clearinghouse bank.

For example, the check may be cleared by presenting the digital image to financial institution 140, which may be a regional branch of the Federal Reserve, along with a request for payment. Financial institution 130 and 150 may have accounts at the regional branch of the Federal Reserve. As will be discussed in greater detail below, financial institution 130 may create a substitute check using the image provided by account owner 110 and present the substitute check to financial institution 140 for further processing. Upon receiving the substitute check, financial institution 140 may identify financial institution 150 as the paying bank (e.g., the bank from which the check is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check may be cleared internally.

Figure 5:
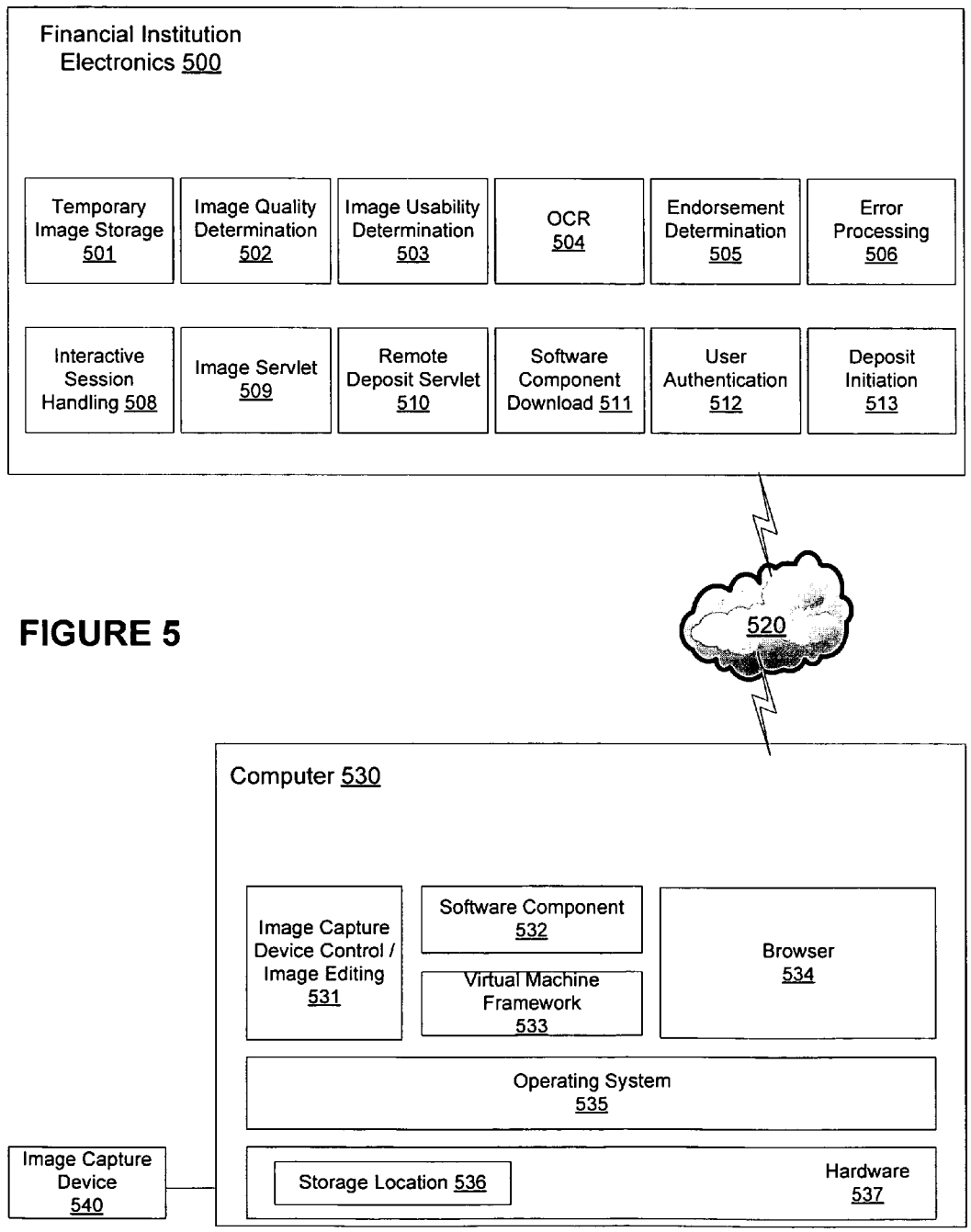
FIG. 5 illustrates financial institution electronics coupled to a computer 530, and the various aspects of electronics 500 and computer 530 that may operate to implement the novel systems, methods, and computer readable media set forth herein.

FIG. 5 illustrates a system for facilitating deposit of a check, in which financial institution electronics 500 communicate with a computer 530 via network 520. There are a variety of unique aspects which may be described with reference to FIG. 5. We begin with a description of operations that may be carried out by the financial institution electronics 500, which will be referred to for the sake of simplicity as "server 500" with the understanding that additional electronics may be involved.

Server 500 may comprise a subsystem 511 for providing a software component 532 to a computer 530. This subcomponent may require the customer to download a virtual machine framework 533 so that the component 532 is operable on the operating system 535 and hardware 537 of the computer 530. In general, the software component allows the financial institution to control certain aspects of check image creation and delivery by the computer 530. Thus, while the computer 530 may be customer-controlled, the customer downloads component 532 to facilitate a deposit, thereby allowing a financial institution to effectively control certain aspects of the image generation and delivery process.

Server 500 may also comprise a subsystem for user authentication 512, such as by requiring a username and password. Other authentication methods such as requiring a digital certificate, data representing a customer fingerprint, and so forth are also possible. User authentication can open an interactive session supported by a component such as 508, in which the user can exchange information with the server 500 and receive instructions from the server 500. In addition, server 500 may, in some embodiments, control operation of the software component 532.

Server 500 may comprise a subsystem for receiving from a customer-controlled general purpose computer such as 530, an identification of an account for deposit of a check, and an amount of said check. "Remote deposit servlet" 510 may for example provide such functions. Remote deposit servlet 510 may provide a user interface (or user interface data) to a browser 534, and such user interface may prompt a customer to enter information such as an account number and an amount of a check for deposit. In an embodiment where multiple checks are being deposited at once, the customer may itemize the checks by writing an amount of each. It will be appreciated that servlet 510 need not directly take responsibility for a website, and may instead merely communicate with one or more other subsystems that are responsible for doing so.

Server 500 may further comprise a subsystem for receiving from computer 530 an image of a front side of said check. "Image servlet" 509 is such a subsystem in the illustrated embodiment. In embodiments where software component 532 is responsible for delivering images to image servlet 509, servlet 509 may be configured to communicate with component 532 as appropriate. In one embodiment, both an image of a front side of a check and an image of a back side of a check are received. These may be two separate images, or may be a single image in which the separately generated images are "stitched together" for simultaneous viewing as a single image.

Server 500 may further comprise a subsystem for analyzing said image of a front side of said check to determine if it meets at least one criterion. Subsystems 502 and 503 may for example perform such determining. In order to automate remote check deposits, it is desirable to configure server 500 to recognize that the image it receives is in fact a check, that the check is valid and not a duplicate, and that the received image can be used to further process the transaction. Image quality determination 502 may thus be provided to ensure that the received image can be used to further process the transaction.

Image usability determination subsystem 503 may further require an image to meet additional criteria. For example, it may be required that the image is in a particular format, e.g. a Joint Photographic Experts Group (JPEG) format. While systems may be designed to handle checks in any format, it may be cost effective to require customers to send in only images of specified formats so as to lower development costs of the system. It may also be required that the image is of a predetermined size, or that the image has features indicating it is a negotiable instrument of a desired type. For example, almost all checks have certain features, such as a MICR line, a signature line, an endorsement area on the back, an amount box, a date, and so forth. Often such features are in a consistent location on the check. A subsystem such as 503 may ensure that such features are present prior to allowing the transaction to continue.

Server 500 may further comprise a subsystem for performing Optical Character Recognition (OCR) on said image of said front side of said check. OCR can be useful in determining MICR line information such as routing number, account number, and check number. It can also be used to determine a check amount by performing OCR on the amount location of the check. Other information such as check date, payor name, payor financial institution, and so forth may be gleaned. Such information may be validated, for example, by comparing it to information such as a list of valid routing numbers, comparing an OCR-determined amount to a customer-entered amount, and so forth, or simply stored in a log file.

Server 500 may further comprise a subsystem for determining if there is an error in said deposit of said check. Error processing 506 may be responsible for this, and may comprise a variety of useful aspects. In one embodiment, error processing 506 may comprise a subsystem for validating a routing number associated with said check. In another embodiment, error processing 506 may comprise a subsystem for determining if said check was previously deposited. For example, if a list of deposited checks is maintained for the depositing customer, then the check number can be compared against such a list. Comparing to a list of all deposits for an entire financial institution, or even multiple financial institutions, is also possible. However, if duplicate checking is to be done in real time, i.e. while the customer waits for confirmation, then it is desirable to streamline the process for example by only determining duplicates from a predetermined set of most likely relevant data.

Error processing 506 may further comprise a subsystem for comparing an amount of a check as provided by a customer to an amount determined by performing OCR on said image of said front side of said check. If the numbers do not match, the server can indicate an error and as a result, not proceed with the deposit transaction. Similarly, such an error may result from any error checking operation performed herein. Alternatively, certain errors can be designated as not meriting aborting a deposit, and may simply result in flagging the transaction for later scrutiny. Such a "transaction flagging" approach is particularly applicable to situations in which a duplicate check deposit is identified. Because duplicate determinations are prone to false positives, simply flagging, rather than aborting, a transaction may be preferable when a duplicate is possible.

OCR may also be applied to an image of a back side of the check. For example, in one embodiment, an OCR analysis of a MICR line location on an alleged image of a back of a check can be made. Backs of checks should not have MICR lines. Therefore, if such OCR process identifies MICR information, it can be determined that the image of the back of a check is improper. Thus, one criterion in analyzing an image of a back of a check may be the absence of a MICR line.

Server 500 may further comprise an endorsement determination subsystem 505. Such a subsystem 505 may determine if a signature appears on said back side of said check. While endorsement of a check is not legally required for depositing a check into the payee's bank account, there are a variety of reasons banks typically require endorsement by the payee. Endorsement determination 505 may comprise simply checking for some indication of handwriting in the endorsement area of the image of the back side of a check. Other embodiments may go further by attempting to recognize an authorized signature of the payee and/or customer.

Server 500 may further comprise temporary image storage 501 for storing images while performing operations such as OCR and error processing. Images stored in temporary storage may be in the original format, i.e. as received from computer 530, or in some other format, such as the bi-tonal TIFF format required by Check 21 legislation, or both. In fact, it can be useful to include in some embodiments a mechanism for converting images from such first format to a second format such as bi-tonal TIFF, and to place such images in a log file.

Server 500 may further comprise a subsystem for initiating a deposit of a check into the specified account 513. Deposit initiation may comprise a wide variety of possible actions, depending on how such operations are initiated in particular bank systems. For example, a deposit might be initiated by "soft posting" or provisionally posting a credit to the customer's account. It might be initiated by forwarding an image to the payor's bank or Federal Reserve. It might be initiated by placing data in a batch file for processing all the deposits for the day. Deposit initiation is any action that sets in motion a chain of automated events resulting in a crediting of the customer's account.

Figure 6:
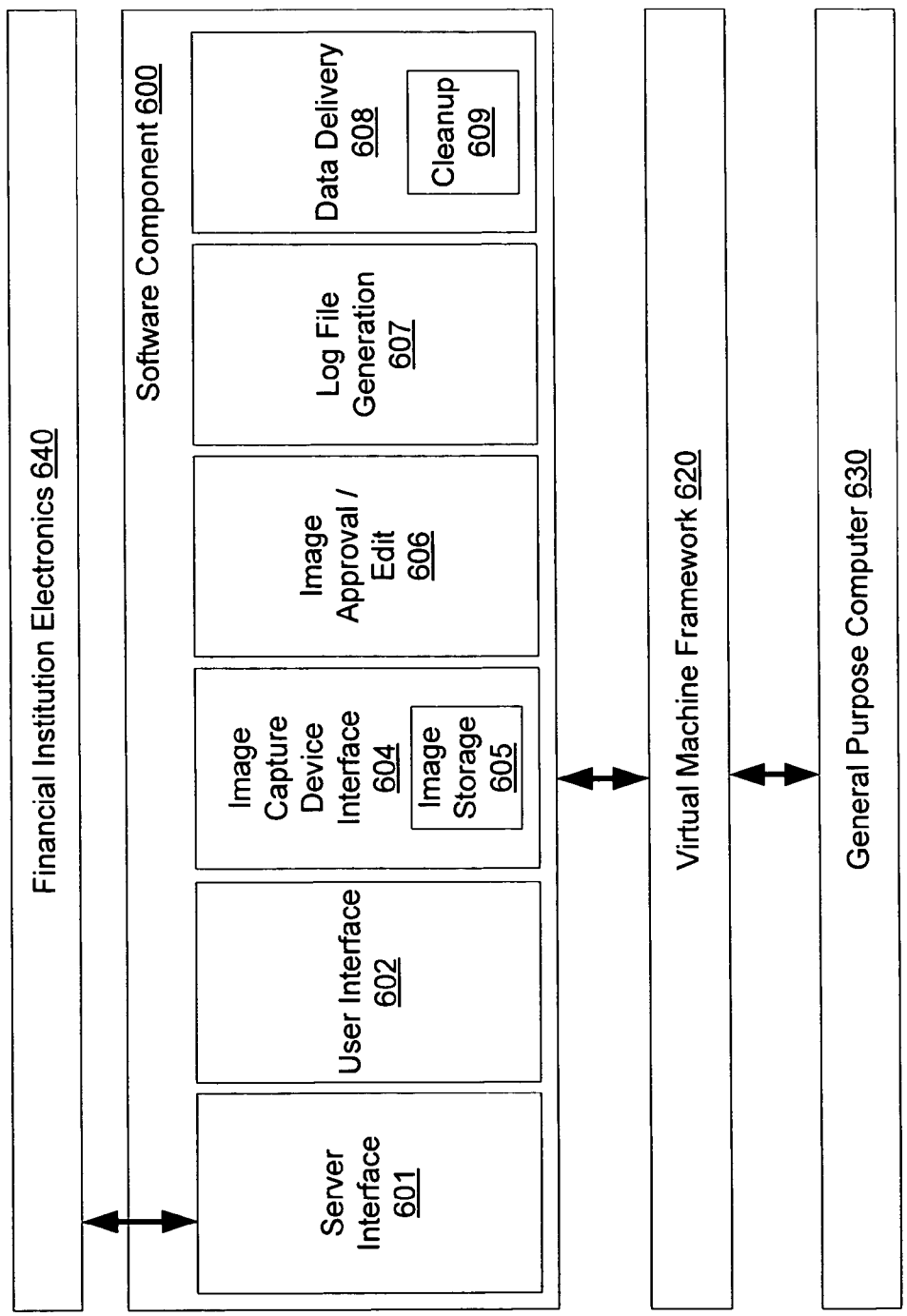
FIG. 6 illustrates a view of the invention with particular focus on the software component 600 which may perform certain operations in connection with embodiments of the invention.

Referring now to computer 530, a number of novel aspects also pertain to computer 530 as well as the interaction between the computer 530 and the server 500. As described above, a software component 532 may be executed by computer 530 in connection with carrying out the invention. One embodiment of the software component is illustrated in FIG. 6. As illustrated in FIGS. 5 and 6, an exemplary component 532 may execute in conjunction with a virtual machine framework 533 as described above. This gives the advantage of developing a single component that works predictably on most customer computers, which may be configured somewhat differently, for example having different hardware 537 and operating systems 535.

A customer may connect to server 500 using a browser application 543 that executes on the computer 530. The customer may view instructions in the browser, for example instructing the customer to log in, instructing the customer to place a check on or in front of an image capture device, instructing the customer to edit an image, and so forth. The browser may run in conjunction with the software component 532, or the software component may run in a separate process and have its own user interface.

Image capture device control software and/or image edit software 531 may also execute on the computer 530. This software 531 interfaces with the image capture device 540, and may serve functions such as initiating image capture, managing image retrieval, facilitating image editing, and so forth. In one embodiment, software 531 may provide an interface so that it can be controlled to some extent by software component 532. If software component is in turn controlled by image servlet 509, the management of the image capture and retrieval process can be performed from the server 500. Alternatively, at any step along the way, the customer can be instructed to perform certain functions using software 531 or component 432, if such functions are better performed, or more conveniently performed by a human.

Storage location 536 provides a location that can be temporarily used by the component 532 to store images and/or a log file that may be generated to persist useful data regarding a deposit transaction.

Operations that are performed by the system comprising computer 530, browser 534, component 532, image capture software 531, image capture device 540, and customer (not shown) can generally comprise providing customer credentials, identifying an account, identifying an amount of a deposit, capturing an image of a front side of a check according to the criteria required by the bank via component 532, cropping and rotating the image of a front side of a check according to the criteria required by the bank via component 532, endorsing and capturing an image of a back side of a check according to the criteria required by the bank via component 532, and delivering such images to server 500.

FIG. 6 illustrates a system for facilitating deposit of a check from a customer-controlled general purpose computer, with special focus on aspects of the software component 600. As illustrated, an exemplary software component 600 may comprise a variety of functional subsystems 601-609. The component may in one-embodiment be server-activated in that it executes various aspects of its functionality after receiving instructions to do so from a server 640. As such, component 600 may have a server interface 601 for receiving commands from the server 640.

As mentioned above, the component 600 may also be designed to interoperate with a virtual machine framework 620, for the purpose of realizing certain benefits as understood in the art to accompany such technologies, such as facilitating widespread distribution and better guarantees of acceptable operation. The framework 620 in turn operates on the platform of the customer's general purpose computer 630.

For example, the component 600 may provide a subsystem 602 for instructing a customer, for example via a user interface visible on a display coupled to a customer-controlled general purpose computer 630, in utilizing an image capture device to generate an electronic image of a front side of a check, such that said electronic image of a front side of a check meets at least one first criterion. In one embodiment, the customer may be instructed for example to place the check face-down in a top left corner of a scanner bed. The customer may further be instructed to place the check in a certain orientation. An image thus produced will meet criteria such as being upright and at a "right angle" with respect to a rectangular image format.

The component 600 may also comprise a subsystem 604 such as image capture device interface for receiving an image of a front side of a check from the image capture device. The image may be immediately uploaded to the server 640, or may be temporarily persisted using image storage function 605. A reason for such temporary persisting is to allow for certain customer modifications, and to allow for generation of further images such as an image of a back side of the check. Although not necessary to the invention, it can be expedient to deliver all images to the server 640 at once.

Once an image is generated, subsystem 602 may further instruct the customer to process the electronic image of a front side of a check. Processing the image may comprise simply approving the image if said image of a front side of a check meets said at least one first criterion. This aspect may also be provided by another subsystem such as 606. For example, the image may be presented to the customer and the customer may be asked if the image is right side up and legible. If so, the customer may approve the image, for example by selecting an appropriate approval button in the user interface.

Components 602, 604, 605, and 606 may operate similarly with regard to capturing an image of a back side of a check. The customer may be instructed by 602 to capture an electronic image of a back side of a check meets at least one third criterion, which may in one embodiment be a same criterion as the first criterion, e.g. image size, image legibility, image orientation, and so forth. The image may be received by the component via 604. The customer may also be asked to approve by 602.

Further to being instructed by 602 and/or 606 to process an image, a customer may be instructed to modify said electronic image of a front side of a check and/or a back side of the check, such that said electronic image of a front side of a check meets at least one second criterion. For example, an image as scanned may be presented to the customer, and the customer may be asked to select a bottom right corner of the check in the image. Assuming the top left corner of the check is also in the top left corner of the image, the customer selection of the bottom right corner of the check can be used to crop out any and all of the image that goes beyond the boundaries of the check.

Component 600 may also comprise a subsystem for generating a log file 607 comprising data associated with said deposit. Exemplary data that may be collected in the log file is an identification of the operating system used by the customer's general purpose computer, an identification of a browser used by the customer's general purpose computer, an identification of an image capture device make and model, an identification of a version of the JAVA virtual machine software, or, if .NET technologies are used, the version of the .NET Framework, and an identification of transaction data, for example a transaction ID, account number, customer name, amount of deposit, check routing number, check number, check account number, and so forth.

Component 600 may also comprise a subsystem for data delivery 608 and cleanup 609. The delivery subsystem 608 may initiate a delivery of images and other data, such as the log file, to the server. It may utilize functionality provided in the server interface 601 if desirable. The cleanup subsystem 609 may delete certain data from the customer's computer 630. For example, any image files that may have been created for temporary purposes may be deleted. Thus cleanup subsystem 609 may remove an electronic image of a front side of a check from a memory associated with said customer-controlled general purpose computer 630.

It should be appreciated that the various illustrations and examples provided herein also disclose corresponding methods and computer readable media bearing instructions for carrying out such methods. Furthermore, in addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed:

1. A system for facilitating deposit of a check, said system comprising:
    a memory storing a plurality of processor executable instructions; and
    a processor in communication with said memory, said processor configured to execute the plurality of processing instructions to:
        provide a remote deposit processing component to a depositor owned device communicatively coupled to a general purpose image capture device;
        receive from the remote deposit processing component on the depositor owned device an identification of an account for deposit of a check, and an amount of said check;
        provide instructions to the remote deposit processing component, said instructions instructing a depositor to:
            position said check with respect to said image capture device to produce an initial image including an image of a front side of said check;
            identify selected points of said initial image to enable cropping of said initial image beyond a boundary of the front side of said check; and
            approve a cropped portion of said initial image, the cropped portion including said image of the front side of said check; and
        receive from said depositor owned device said image of the front side of said check;
        analyze said image of the front side of said check to determine whether said image of the front side of said check meets at least one criterion;
        perform Optical Character Recognition (OCR) on said image of the front side of said check;
        determine whether there is an error in said deposit of said check, by validating a routing number associated with said check, determining whether said check was previously deposited, and comparing said amount of said check to an amount determined by performing OCR on said image; and
        initiate said deposit of said check into said account.

2. The system for facilitating deposit of a check of claim 1, wherein the processor is further configured to execute the plurality of instructions to authenticate an identity of a customer that is operating said depositor owned device.

3. The system for facilitating deposit of a check of claim 1, wherein the processor is further configured to execute the plurality of instructions to receive from said depositor owned device an image of a back side of said check.

4. The system for facilitating deposit of a check of claim 3, wherein the processor is further configured to execute the plurality of instructions to determine whether a signature appears on said back side of said check.

5. A processor-implemented method for facilitating deposit of a check, said method comprising a processor:
    providing a remote deposit processing component to a depositor owned device communicatively coupled to a general purpose image capture device;
    receiving from the remote deposit processing component on the depositor owned device an identification of an account for deposit of a check, and an amount of said check;
    providing instructions to the remote deposit processing component, said instructions instructing a depositor to:
        position said check with respect to said image capture device to produce an initial image including an image of a front side of said check;
        identify selected points of said initial image to enable cropping of said initial image beyond a boundary of the front side of said check; and
        approve a cropped portion of said initial image, the cropped portion including said image of the front side of said check; and
    receiving from said depositor owned device said image of the front side of said check;
    performing Optical Character Recognition (OCR) on said image of the front side of said check;
    analyzing said image of the front side of said check to determine whether said image of the front side of said check meets at least one criterion;
    determining whether there is an error in said deposit of said check, said determining comprising validating a routing number associated with said check, determining whether said check was previously deposited, and comparing said amount of said check to an amount determined by performing OCR on said image; and
    initiating said deposit of said check into said account.

6. The method for facilitating deposit of a check of claim 5, further comprising authenticating an identity of a customer that is operating said depositor owned device.

7. The method for facilitating deposit of a check of claim 5, further comprising receiving from said depositor owned device an image of a back side of said check.

8. The method for facilitating deposit of a check of claim 7, wherein said determining whether there is an error in said deposit of said check comprises determining if a signature appears on said back side of said check.

9. A non-transitory computer-readable storage medium comprising computer-executable instructions, that when executed by a processor, causes the processor to:
    provide a remote deposit processing component to a depositor owned device communicatively coupled to a general purpose image capture device;
    receive from the remote deposit processing component on the depositor owned device an identification of an account for deposit of a check, and an amount of said check;
    provide instructions to the remote deposit processing component, said instructions instructing a depositor to:
        position said check with respect to said image capture device to produce an initial image including an image of a front side of said check;
        identify selected points of said initial image to enable cropping of said initial image beyond a boundary of the front side of said check; and approve a cropped portion of said initial image, the cropped portion including said image of the front side of said check; and receive from said depositor owned device said image of the front side of said check;

perform Optical Character Recognition (OCR) on said image of the front side of said check;

analyze said image of the front side of said check to determine whether said image of the front side of said check meets at least one criterion;

determine whether there is an error in said deposit of said check, by validating a routing number associated with said check, determining whether said check was previously deposited, and comparing said amount of said check to an amount determined by performance of the OCR on said image; and initiate said deposit of said check into said account.

10. The non-transitory computer-readable medium of claim 9 further comprising instructions, which when executed by the processor, cause the processor to:

authenticate an identity of a customer that is operating said customer owned device.

11. The non-transitory computer-readable medium of claim 9, wherein the instructions to receive from said customer owned device cause the processor to:

receive from said depositor owned device an image of a back side of said check.

12. The non-transitory computer-readable medium of claim 11, wherein the instructions to determine cause the processor to:

determine whether a signature appears on said back side of said check.

\* \* \* \* \*